Sept. 10, 1957   G. A. LOWDEN   2,805,471
METHOD FOR LOCATING PATHS OF WIRES ON LACING BOARD
Filed Sept. 25, 1953   2 Sheets-Sheet 1
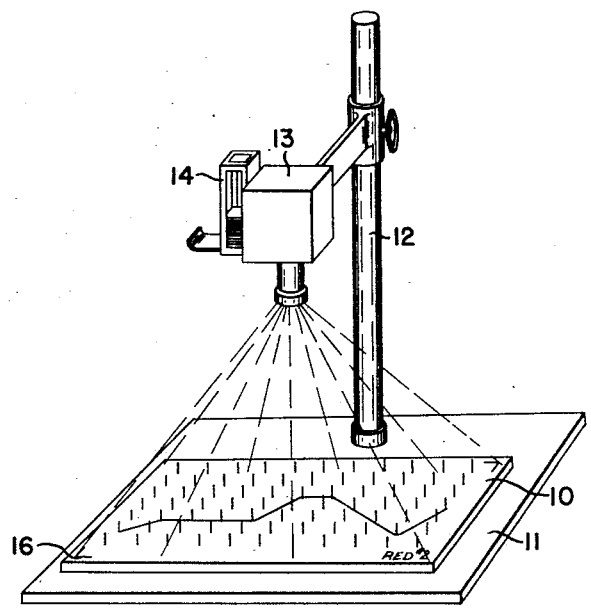
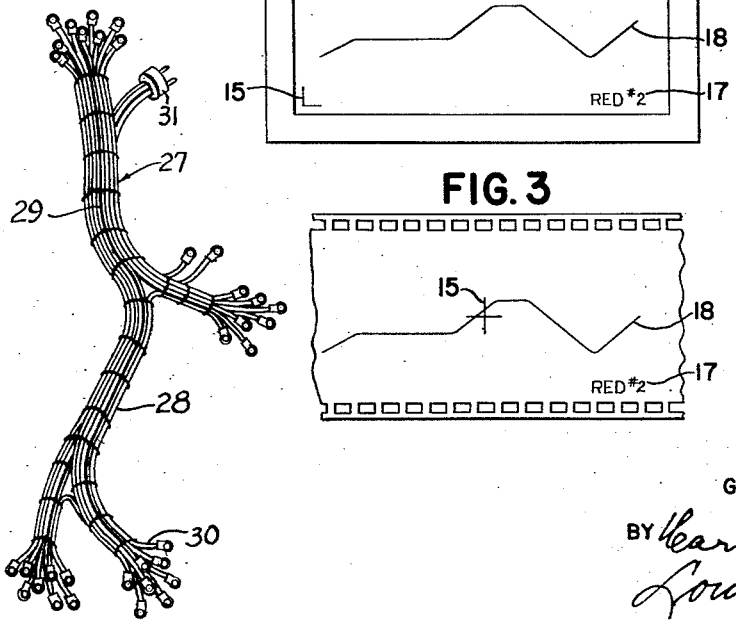
INVENTOR
GORDON A. LOWDEN
BY
HIS ATTORNEYS Sept. 10, 1957         G. A. LOWDEN         2,805,471

METHOD FOR LOCATING PATHS OF WIRES ON LACING BOARD

Filed Sept. 25, 1953         2 Sheets-Sheet 2

INVENTOR
GORDON A. LOWDEN
BY
HIS ATTORNEYS

United States Patent Office 2,805,471
Patented Sept. 10, 1957

2,805,471

METHOD FOR LOCATING PATHS OF WIRES ON LACING BOARD

Gordon A. Lowden, Miamisburg, Ohio, assignor to The National Cash Register Company, Dayton, Ohio, a corporation of Maryland Application September 25, 1953, Serial No. 382,313

1 Claim. (Cl. 29—155.5)

The invention consists in a novel method for indicating the paths of wires to be placed on a lacing board in the building up of a wiring harness.

Wiring harnesses find wide use in electrical machinery to provide electrical circuit connections between components in one section of a machine and components in another section. In order to conserve space, it is desirable that such harnesses follow the contours of the machine, and an irregular or tortuous shape is therefore often assumed by the harness. Also, since connections between many components are often embodied in one harness, the harness may be a large one containing many wires having various leads branching off from the main body at various points and in various attitudes.

In certain instances in the past, lacing boards for forming wiring harnesses were provided with a plurality of nails or pegs, which extended from the face of the board in a predetermined pattern and through which the wires were guided according to the particular pattern for each wire, and these pegs usually were numbered or identified by their location on the board, using some form of coordinates. In order that a wire would be placed on the board in the proper pattern, it was the custom to provide a guide card or chart for each wire, giving the starting point, the finishing point, and the numbers of the intervening pegs about which the wire was to be guided. Where large boards were necessary due to the making of large and involved harnesses, the problem of locating the paths of the wires by the peg numbers became increasingly difficult.

In other instances in the past, a diagram of the harness, showing starting and finishing locations and the path of all the wires, was placed on the lacing board and used as a guide. While this arrangement was of some aid in locating the wires, it did not completely overcome the problem of rapidly locating the paths of the wires, because both the starting and the finishing points of each wire still had to be located, and, when there were many wires in each harness, there were many starting and finishing points on the board, which rendered the selection of the proper ones difficult.

The instant invention overcomes these drawbacks and facilitates the locating of the wires on the lacing board. This is accomplished by uniquely indicating the path of each of the wires separately on the board in such a manner that the entire path is immediately apparent.

In order to obtain the unique indication, the path of each wire is photographed on a separate transparency, which may be either an individual slide or a frame of film, to be projected, and, when projected, the path appears as a distinctive light pattern on the lacing board. In making up a harness which contains a plurality of wires, the paths of the different wires making up the complete harness are placed on various ones of a set of slides or on successive frames of a film and are projected one after another on the lacing board as the harness is being built up.

The person placing the wires on the board merely places the wire along the distinctive light patterns and is not required to locate each path by the pin numbers or to search out the start and finish locations and the path of the wire on a print on the board, because both the path of each wire and the location of its starting and finishing points are provided by the light pattern.

If pre-cut wires of different lengths and different color coding are used in building up a harness, then each slide of the set or each frame of the film can also project on the board the necessary data as to the color and any other identifying data pertaining to the wire which is to be placed on the board along the projected light pattern.

By thus making the various paths of the wires immediately visually apparent, the invention has the advantages that it speeds up the building up of harnesses by experienced operators and aids in training new operators, and is of particular advantage in operations in which the types of harness to be made vary greatly and only a few of each type are made, so that the operators are unable to become very familiar with the locations of all the wires on all of the various types of harnesses.

It is an object of the invention, therefore, to provide a method and apparatus for simplifying the building up of wiring harness on a lacing board by uniquely indicating on the lacing board the paths of the wires making up the harness.

A further object of the invention is to provide a means for immediately visually indicating the paths of the wires separately on a lacing board, one after another, in order to facilitate the building up of a wiring harness.

A further object of the invention is to provide means to facilitate the building up of the wiring of a harness on a lacing board by projecting a line of light on the lacing board for each wire of the harness in succession, each line of light being so shaped as to occupy the exact path that the wire is to follow when placed on the board, whereby the placing of the wires on the board is expedited.

With these and incidental objects in view, the invention includes certain novel features of construction and combinations of parts which will become apparent from the embodiments which are hereinafter described with reference to the drawings which accompany and form a part of this specification.

In the drawings:

Fig. 1 shows a slide projector for directly projecting a light-line on a lacing board according to the path over which a wire of a harness is to be placed, using a set of slides to project the paths of the different wires.

Fig. 2 shows a slide which would be used in projecting the light-line in Fig. 1.

Fig. 3 shows one frame of a film which would be used in projecting a light-line in the form of apparatus of Fig. 3.

Fig. 5 shows a typical wiring harness which may be formed by using the novel method of the present invention.

Figure 4:
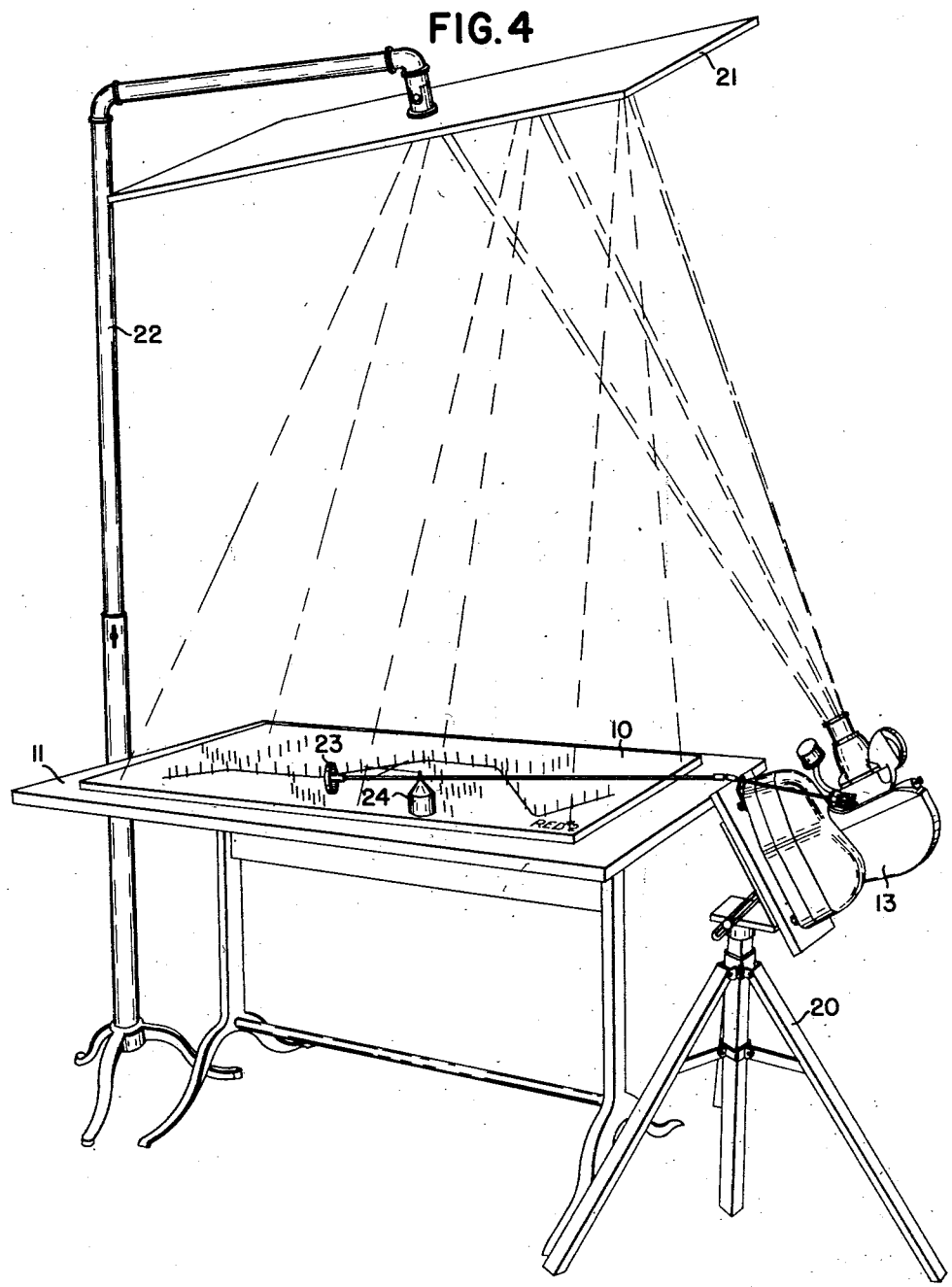
Fig. 4 shows an apparatus for projecting light-lines on large lacing boards, utilizing indirect projection and using a slide film projector for projecting a slide film on which the different paths of the different wires making up the harness have been photographed in successive frames.

The novel method by which wires making up a wiring harness can readily be located on a lacing board utilizes the following steps: first, making an individual pattern of the path of each of the wires; next, photographing these patterns on transparencies or separate frames of film, so that, when projected, they will produce a pattern of light for distinctly and directly indicating the path of each wire; then projecting the patterns one after another on a lacing board; and finally placing wires along the paths indicated by the light patterns as they are projected on the board.

The light patterns which are projected on the board provide a direct visual indication of the paths of the wires, which need only be followed to facilitate the placing of the wires on the lacing board.

One way of practicing the novel invention is to make an individual drawing of each path. These drawings are then photographed individually on slides or on separate frames of a film along with identification data and locating indicia in such a manner that, when projected, the path will show as a brilliant white line on the board, and the identifying data and locating indicia will similarly be visible on the board.

Each path is then projected onto the lacing board to provide a clear bright line of light on the board, along which line the wire can readily be laid, the line of light indicating the start, finish, and intermediate path of the wire.

As soon as all the wires of a harness have been laid in place on the board, they can be laced together to form the finished harness.

When photographing the drawings of the paths of the wires, care must be taken to insure that the projected paths will accurately maintain the proper pattern and will not be distorted, in projection, to give erroneous results.

Two forms of apparatus for projecting light patterns on lacing boards are shown in the drawings.

In the form of apparatus shown in Figs. 1 and 2, the lacing board 10 is supported on a table 11, which has affixed thereto a standard 12, on which is adjustably mounted a slide projector 13. The projector 13 is of the type which is provided with a magazine 14, in which a plurality of slides for projecting the paths of the different wires of a harness can be stored and can be projected on the board one after another as the harness is being built up. In the apparatus shown in Fig. 1, the lacing board 10 is of the type which has pegs located thereon in a uniform geometrical pattern, and the projector 13 is arranged to project the light pattern directly on the board. This arrangement of projector and lacing board is particularly useful with smaller lacing boards because projection can be effected directly without requiring that the projector be located at too great a distance from the board.

If desired, the first slide of the set can contain descriptive data pertaining to the particular harness and can contain locating marks, similar to the marks 15 on the slide in Fig. 2, which can be projected on the table to serve as means to locate the lacing board on the table in proper relation to the projector. When the lacing board is located on the table with its locating marks 16 in proper alinement with the projected marks, then the operator operates the projector to project the next slide onto the board. As shown in Fig. 2, this slide, in addition to the locating marks 15, will have data 17 thereon to identify the wire to be used and will have thereon the path 18 which the wire is to take on the lacing board.

When the projected locating marks of this next slide coincide with the marks 16 on the lacing board, then the projected light path on the board will be the path which the wire must occupy in the harness. This path is made immediately visible by the brilliant path of light, and all that the person making the harness need do is take the wire called for by the slide and place it on the board in the path projected thereon.

It is clear that the placing of the wire in the proper place on the board has been simplified, because, instead of tracing the path of the wire according to the numbers of pegs as given on a chart, all that is necessary with the novel apparatus is merely to follow the line of light in order to place the wire on the board properly.

As soon as each wire has been placed along its projected line of light, another slide can be projected to show the path of the next wire to be placed on the board. This procedure will be followed until all the wires are in place on the board, and the wires will then be laced together to form the harness.

The other form of apparatus is shown in Figs. 3 and 4. In this form of apparatus, which is particularly adapted for large lacing boards, the lacing board 10 is also supported by a table 11.

The lacing board 10 of Fig. 4 is of the type in which a print of the wiring of the harness is placed on the board to indicate the starting and finishing points of all the wires and their intermediate paths. Pegs extend from the board along the several paths which the wires may take to assist in retaining the several wires in place during the building up of the harness.

A projector 13, which is adapted to project frames of a film like that shown in Fig. 3, is mounted on a suitable support 20 adjacent the table 11 and projects the data on the film into a mirror 21, which is supported above the lacing board 10 by a standard 22 and which reflects the data onto the board 10.

Each frame of the film as shown in Fig. 3 contains the locating mark 15, which in this form is shown as crossing center-lines; the path of the wire 18; and the identifying data 17.

The operation of the apparatus in Fig. 4 is substantially like that of Fig. 1. First, a frame of film is projected to assist in locating the lacing board in proper relation to the projector, then the paths of the several wires are projected one after another.

In the apparatus of Fig. 4, a suitable advancing handle 23, which is movable about the board and held in place thereon by a weight member 24, may be operated to advance the film frame by frame through the projector.

While the slide of Fig. 2 and the frame of film in Fig. 3 contain only one wire path, it is obvious that, if there are several wires in the harness whose paths did not intersect, the paths of two or more such wires, together with their related data, could be photographed on a single slide or frame of the film and be projected simultaneously on the lacing board.

In those cases where the build-up of the harness has resulted in a rather large bundle of wires over a particular portion of the harness and this bundle of wires has impaired the visibility of the projected light path in this portion of the harness, all that need be done is to move a small white card along the path immediately above the bundle of wires, and the path again becomes clearly visible and capable of readily outlining the required path of the wire.

It is to be understood that, while different types of projectors are shown in Figs. 1 and 4, the invention is not limited to these arrangements, and either type of projector may be used in the arrangements of Figs. 1 and 4.

The novel method and apparatus of this invention, by which the paths of the wires making up a wiring harness are projected on a lacing board, one after another, as clearly visible lines of light which can readily be followed in placing the wires on the board, therefore, overcomes the drawbacks of prior-art systems, in which the paths had to be determined from a chart giving the location of pegs or by searching out the desired path on a print which contained the paths of all the wires. In thus overcoming the drawbacks of the prior art and making the path of each wire readily apparent, the instant invention enables the time required for building up the harness to be materially reduced.

A typical harness 27, which has been formed by using the novel method of this invention, is shown in Fig. 5. Each of the individual wires 28 of the harness 27 has been laid out on the lacing board 10, about the pegs on said board, one after another, as their paths were indicated by projection of the slide or frame of the film strip, and have then been secured together in tight, assembled relation by the lacings 29, which are conventionally of a cord material and which assist in retaining the harness in its tortuous configuration. The irregular or tortuous configuration of the harness 27, which permits it to conform closely to the irregular surface of the machine with which it is to be used, results from the irregular path of each wire 28, said path being composed of a series of short incremental portions, angularly related to each other to form the desired configuration. The lengths of the wires 28 will vary according to the distance between the particular components to which they are to be connected, and will also vary according to their position in the harness, since, for example, a wire located along the inner edge of a curved or bent portion of the harness will be shorter than one at the outer edge of such a portion. The ends of the various wires 28 form leads 30, which extend from the harness 27 at various predetermined points, so that they will be positioned adjacent the components to which they are to be connected when the harness is placed in position. The leads 30, if desired, in some cases may be connected to a plug unit 31, to facilitate connection to a particular component.

While the method and forms of apparatus shown and described herein are admirably adapted to fulfill the objects primarily stated, it is to be understood that it is not intended to confine the invention to the particular forms of apparatus disclosed herein, for it is susceptible of embodiment in various other forms without departing from the invention.

What is claimed is:

The method of forming a wiring harness having a tortuous configuration to conform to the outline of a machine with which it is to be associated, and to the positions of electrical terminals to be connected on said machine, said method being one by which the individual paths of intersecting tortuous paths of a plurality of wires making up the wiring harness can be readily located on a lacing board having thereon pegs defining a plurality of different paths, and the wires can be readily placed thereon and guided about the pegs to build up the harness, and including the following steps: first, preparing a plurality of projectable transparencies, each transparency having thereon a separate pattern, according to the path, length and terminal positions which a particular one of the wires is to occupy in the harness, the pattern being made on each transparency in such a manner that, when projected, the path of each wire will show individually as a distinctive line of light having the contour of a group of substantially straight lines joined together to form a tortuous path; placing coded information on the transparency to identify the wire to be used; passing light through the transparencies, one after another, to project each pattern separately, one after another in sequence, in proper position on the lacing board, to produce said lines of light thereon in succession, each line of light picking out, from the plurality of possible intersecting paths defined by the pegs on the board, the necessary incremental paths which are joined together to form the tortuous path that its related wire is to occupy; selecting a wire according to the coded information projected from the transparency; placing the wire about the pegs along the projected tortuous path, as indicated by the light line, while its related pattern is projected, the plurality of wires being placed on the board one at a time, as their related paths are projected, until the required harness is built up; and lacing the assembled wires together by a lacing operation to bind said wires tightly and retain them in their tortuous configurations to form the finished harness.

References Cited in the file of this patent

UNITED STATES PATENTS

| | | |
|---|---|---|
| 1,987,635 | Poppelmeier | Jan. 15, 1935 |
| 2,263,337 | Kamborian | Nov. 18, 1941 |